US012748394B2

(12) United States Patent
Bárcena Ruiz et al.

(10) Patent No.: US 12,748,394 B2
(45) Date of Patent: Sep. 29, 2026

(54) MODEL-BASED PREDICTIVE CONTROL METHOD FOR STRUCTURAL LOAD REDUCTION IN WIND TURBINES

(71) Applicant: Universidad del País Vasco / Euskal Herriko Unibertsitatea, Leioa (ES)

(72) Inventors: Rafael Bárcena Ruiz, Bilbao (ES); Ainhoa Etxebarria Egizabal, Bilbao (ES)

(73) Assignee: Universidad del País Vasco / Euskal Herriko Unibertsitatea, Leioa (ES)

( * ) Notice: Subject to any disclaimer, the term of this patent is extended or adjusted under 35 U.S.C. 154(b) by 919 days.

(21) Appl. No.: 17/923,836

(22) PCT Filed: May 5, 2021

(86) PCT No.: PCT/ES2021/070310
§ 371 (c)(1),
(2) Date: Nov. 7, 2022

(87) PCT Pub. No.: WO2021/224532
PCT Pub. Date: Nov. 11, 2021

(65) Prior Publication Data

US 2023/0176533 A1 Jun. 8, 2023

(30) Foreign Application Priority Data

May 7, 2020 (ES) ................................ ES202030405

(51) Int. Cl.
*F03D 7/04* (2006.01)
*G05B 13/04* (2006.01)
(Continued)

(52) U.S. Cl.
CPC ........... *G05B 13/048* (2013.01); *F03D 7/045* (2013.01); *H02J 3/381* (2013.01); *F03D 7/00* (2013.01);
(Continued)

(58) Field of Classification Search
USPC ........................................................... 700/29
See application file for complete search history.

(56) References Cited

U.S. PATENT DOCUMENTS

2008/0067815 A1 3/2008 Suryanarayanan et al.
2015/0369214 A1* 12/2015 Herbsleb ................ F03D 7/022
416/61

(Continued)

FOREIGN PATENT DOCUMENTS

EP 2799711 A1 11/2014

OTHER PUBLICATIONS

International Search Report and Written Opinion dated Sep. 10, 2021 issued in PCT International Patent Application No. PCT/ES2021/070310 (with English language translation).

(Continued)

*Primary Examiner* — Emilio J Saavedra
(74) *Attorney, Agent, or Firm* — Amster, Rothstein & Ebenstein LLP

(57) ABSTRACT

Model-based predictive control method (MPC) for the reduction of structural load in wind turbines comprising: exclusively proposing a single internal linear model for the MPC for the entire operating range of the turbine; obtaining the adjustable parameters of the linear internal model from the experimental data previously measured in the turbine; choosing the discrete time values for the control and prediction horizons; adjusting the MPC controller and performing a practical implementation test.

12 Claims, 6 Drawing Sheets

(51) Int. Cl.
*H02J 3/38* (2006.01)
*F03D 7/00* (2006.01)
*H02J 101/28* (2026.01)

(52) U.S. Cl.
CPC ..... *F05B 2260/84* (2013.01); *F05B 2270/404* (2013.01); *G05B 2219/2619* (2013.01); *H02J 2101/28* (2026.01)

(56) References Cited

U.S. PATENT DOCUMENTS

| | | | | |
|---|---|---|---|---|
| 2018/0100488 | A1* | 4/2018 | Miranda | G05B 15/02 |
| 2020/0340450 | A1* | 10/2020 | Grunnet | F03D 7/0296 |
| 2020/0362819 | A1* | 11/2020 | Abbaszadeh | F03D 7/045 |
| 2021/0115895 | A1* | 4/2021 | D'Amato | F03D 7/045 |
| 2022/0082083 | A1* | 3/2022 | Hovgaard | F03D 7/0296 |

OTHER PUBLICATIONS

Mahdizadeh et al., "LIDAR-Assisted Exact Output Regulation for Load Mitigation in Wind Turbines," ARXIV.org, Cornell University Library, 201 Olin Library Cornell University Ithaca, New York 14853, Jun. 15, 2019, XP081500449, 31 pages.
Liu et al., "Economic Model Predictive Control for Wind Turbine," Proceedings of the 38th Chinese Control Conference, Technical Committee on Control Theory, Chinese Association of Automation, Jul. 27-30, 2019, Guangzhou, China, pp. 2919-2923.
Barcena et al., "Wind Turbine Structural Load Reduction by Linear Single Model Predictive Control," IEEE Access, vol. 3, May 21, 2020, pp. 98395-98409.
Barcena et al., "LIDAR-Assisted Wind Turbine Structural Load Reduction by Linear Single Model Predictive Control," IEEE Access, vol. 8, Aug. 6, 2020, pp. 146548-146559.
Zierath et al., "Introduction of Model Predictive Control for Load Reduction on a 3,0 MW Wind Turbine," Brazil Windpower 2015 Conference and Exhibition, Sep. 2015, www.brazilwindpower.org, 17 pages.
Chen et al., "Active Damping of Torsional Vibrations in the Drive Train of a DFIG Wind Turbine," International Conference on Renewable Energies and Power Quality (ICREPQ'14), Cordoba, Spain, Apr. 8-10, 2014, Renewable Energy and Power Quality Journal (RE&PQJ), vol. 1, No. 12, Apr. 2014, pp. 270-275.

* cited by examiner

MODEL-BASED PREDICTIVE CONTROL METHOD FOR STRUCTURAL LOAD REDUCTION IN WIND TURBINES

CROSS-REFERENCE TO RELATED APPLICATIONS

This application is a U.S. national stage entry under 35 U.S.C. § 371 of PCT International Patent Application No. PCT/ES2021/070310, filed May 5, 2021, which claims priority to Spanish Patent Application No. P202030405, filed May 7, 2020, the contents of each of which are hereby incorporated by reference in their entirety.

OBJECT OF THE INVENTION

The present invention is aimed at, as its name suggests, the development of a method that, using Model-based Predictive Control or MPC, is capable of improving the performance of wind turbines.

The flexibility of the MPC allows achieving the proposed objective in various ways, such as, for example, reducing torsional vibrations in the turbine drive train (shaft and/or gearbox) and vibrations of the blades in the plane of rotation, reducing the structural loads and balancing the relationship between mechanical and electrical disturbances, limiting the maximum torsion of the shaft and/or blades, the maximum rotor speed, etc, . . . .

The present invention specifically focuses on the application of the model-based predictive control (MPC) method using a single internal linear model to, as a control objective, reduce torsional vibrations in the turbine drive train (shaft and/or gear box), as well as to attenuate the vibrations of the blades appearing in the plane of rotation which, moreover, are very often the trigger for the first ones. The drive train is one of the elements with the greatest susceptibility to failure throughout the life of the turbine, especially in the increasingly frequent and flexible large turbines installed in locations that are quite inaccessible and subject to great excitation disturbances (such as those located off the coast or "offshore"). The method is explicitly proposed for the operating zone of the turbines above the nominal wind speed (zone III), where the mentioned structural load is greater, without prejudice to the fact that it can be easily extended to the rest of the zones.

BACKGROUND OF THE INVENTION

As is known, obtaining energy from the wind or wind energy is a technique that has gained importance in recent years and that still expects to grow significantly in the near future. This, obviously, has also led to the search for safer and more profitable installations, which in the medium and long term has made the control system one of the essential components of modern wind turbines. This is because the control helps to reduce costs, both rated to manufacturing and maintenance, because it can achieve direct load reductions, expand the energy extracted and allow efficient integration of system improvements.

To carry out this control, it is necessary to resort to the well-known control theory, which is an interdisciplinary field of engineering and mathematics that deals with the behavior of dynamic systems, that is, systems whose state evolves over time and which, basically, consist of controlling the input to the system to obtain the desired effect on the output.

One specification thereof is the so-called optimal control, which solves optimization problems in systems that evolve over time and are susceptible to being influenced by external forces, where, once the problem has been solved, it provides us with an optimal behavior path for the control variables, that is, it indicates what actions must be followed in order to bring the entire system from an initial state to a final state, on an optimal basis.

Thus, in the field of optimal control, one of the classic methods used is Linear Quadratic Regulators (LQR), where the dynamics of the system is described by a set of linear differential equations and a quadratic cost function is defined that collects the deviations of the controlled system over a time horizon that includes all the transitory dynamics of interest (infinite prediction horizon). The minimization of this function using the feedback of the internal states of the system, in the aforementioned horizon, provides us with the optimal control law.

This classic control system, which has been used successfully in many fields and applications, nevertheless suffers from two main and important drawbacks in the field of control applied to wind energy.

Firstly, infinite prediction horizon methods, such as LQR, require that the transient dynamics of the controlled system be fully included in the computation of the path optimization of the manipulated variables so that the cost function computation can converge. Thus, when the open-loop system has a slow response in relation to the sampling period used, as is the case with wind turbines, this forces the use of very long horizons that carry a high computational overhead.

Therefore, the LQR is a classic optimal control method that cannot be used practically in wind, precisely because it needs a very long prediction time horizon given the slow dynamics of the turbine, which leads to computational overhead.

Secondly, and most importantly, this classical method of optimal control does not consider restrictions on the variables involved in the optimization. Therefore, if in practice, a restriction, for example, the saturation of the manipulated variable, alters the linear dynamic behavior that the LQR controller has predicted, this behavior can be greatly affected, becoming unstable, even when the plant and the controller are nominally stable.

Due to the above, the attempts to apply controllers of this type to wind turbines have basically remained as theoretical proposals, far from the real application. An example of this would be the publication "Xu Hao; Xu Honghua; Chen Liang; Wenske Jan "Active damping of torsional vibrations in the drive train of a DFIG wind turbine". Renewable Energy and Power Quality Journal (RE & PQJ), Vol. 1, No. 12, April 2014". Therein, an LQR controller is proposed to reduce the torsional vibrations that appear on the shaft of a wind turbine equipped with a DFIG generator, when an electrical event occurs—voltage drop for 150 ms.—on the supply system. However, the study is carried out exclusively using numerical simulations and at no time does it perform any computational cost calculation. Only the use of a steady state observer is mentioned, precisely to reduce this computational load. Likewise, the limitations of the generator torque are not taken into account when calculating the optimal control. As mentioned before, the appearance of saturation in the manipulated variable during the optimal control path—something very common in zone III, when gusts of wind occur—can even lead the system to instability. Therefore, it is not a system that is feasible in practice, both because of the possible instability of the controlled system, and because of the excessive computation that it entails.

For its part, the methodology based on MPC can satisfactorily solve both drawbacks and, in addition, it can take advantage of the formal developments of the classic optimal control related to the control nominal stability, through the use of weights and/or terminal restrictions in the so-called dual-mode MPC. This makes this technique a very powerful tool to manage multiple input and output systems, including restrictions and future predictions for disturbances and control instructions (hereinafter by its English term "set-points" from the expression "control set-points") in its formulation, being also robust against modeling errors.

However, this methodology also has drawbacks or, rather, limitations, as it must respond to the need to solve an optimization problem with restrictions in real time, which represents a significant challenge, in computational terms, to controller practice implementation, given the necessary reliability measures that wind installations must comply with. Therefore, the methodology proposed in this invention focuses precisely on the application of MPC techniques to the control of a wind turbine, with special emphasis on their practical applicability.

As might be expected, the clear advantages that the MPC methodology offers, also for this area of application, have not gone unnoticed. For almost two decades there have been numerous contributions in the academy field of the application of MPC to the control of wind turbines. However, one of the most remarkable characteristics of the aerodynamic dynamics of a wind turbine is its highly non-linear nature. This forces either to linearize the behavior for multiple operating points, resulting in multiple internal models for the controller (MMPC control); or to use a simplified non-linear model as an internal model, giving rise to a non-linear controller (NMPC control). Unfortunately, both options have serious implementation problems, if we consider the technical limitations of the available control platforms and the safety margins currently required for these machines.

On the one hand, applying linear MMPC techniques requires the design of multiple controllers, for the various operating points, each one with a different internal model and keeping active, in parallel, at least an important part—the state observer—of all these controllers during operation; to ensure smooth transition from one to the other, as the turbine passes through the entire operating range, depending on the incident wind, which must also be estimated online. The better the required performance and the smoother the transitions, the more software we must have running in parallel. This greatly increases the computational load and the risk of having robustness problems.

Thus, for example, in the publication "Janos Zierath, Uwe Jassmann, Dirk Abel, Frank Weber" Introduction of model predictive control for load reduction on a 3 MW Wind Turbine ". Conference: Brazil Windpower September 2015.", it is proposed to use a standard MMPC control to reduce the structural load of a wind turbine. However, the study is based on linearized models of the turbine at each operating point. This forces us to change the controller depending on whether we have one incident wind or another, that is, using numerous linear models. In addition, it forces to keep the state observers of all the controllers running all the time in parallel to avoid abrupt transitions between operating points. Finally, the effective incident wind must be estimated online to decide at which operating point we are at each instant. As a consequence of all this, we have again the problem of computational overhead, if we use a standard control platform for the generator.

It is also known that the accuracy with which the set of linear models reproduces the behavior of the turbine and, therefore, the quality of the prediction and the performance obtained is quite improvable. In fact, recent application studies show only slightly better results than those obtained using a standard controller. Of course, the advantages of the MMPC in terms of imposing restrictions on execution parameters—for example, structural loads—and allowing the addition of new sensors are maintained.

On the other hand, using the NMPC methodology requires solving online a nonlinear optimization problem that involves a much higher computational load, at least if the internal model includes sufficient degrees of freedom and, what is more important, whose convergence in a reasonable number of iterations is not guaranteed in advance.

That again forces us to face the dilemma between computational load and performance: if we limit the first one, limiting the maximum number of iterations—accepting, therefore, a quasi-optimal solution and/or r giving up a certain number of degrees of freedom in the simplified non-linear internal model, we also limit the second one. In fact, there are numerous reference works that are dedicated to the study of the potential of this type of controllers and that are exclusively based on numerical simulations that demonstrate a great potential performance, but that openly recognize the impossibility of implementation, at least in the current control platforms.

No less important is the fact that the control of the angle of attack ("pitch") of the turbine blades, used for wind values above the nominal—operational region III—, appears classified in the protocols of certification of wind mills as a safety system—because it is in charge of guaranteeing that the rotational speed of the rotor does not exceed dangerous values for the structure and the environment-, which obliges it to meet very high technical requirements. That, among other reasons, makes it extremely difficult to convince a manufacturer to go for a pitch controller other than the very robust and mature standard controllers, called "proportional-integral gain-scheduled". However, the vast majority of the MPC approaches that have been made from the academy use the angle of attack as the main manipulated variable, forcing a very strong bet by manufacturers, considering the above mentioned difficulties of practical implementation. This has meant that, today, there are few wind mill manufacturers that incorporate the MPC methodology in the development of the control systems of their installations.

Finally, some patent documents related to the reduction of different structural loads in wind turbines are known. For example, US 2008/0067815 for "Vibration damping method for variable speed wind turbines", which proposes a vibration controller in wind turbines that today can be considered completely standard in the industry. This document, however, does not use the predictive control method based on the MPC model, but is based on the use of band-pass filters to inject vibrations measured in the push-pull shaft into the generator torque. The only input to the two-mass model that the proposed implementation uses is the generator speed.

Finally, EP 2799711, for "Method of operating a wind turbine", although it uses a standard MPC controller, it is based on the use of multiple linearized models to impose restrictions on the maximum values of aerodynamic thrust supported by the turbine as a whole, using the management of the aforementioned angle of attack of the blades or "pitch", with the above mentioned problems that this entails.

DESCRIPTION OF THE INVENTION

The present invention solves the problems of the aforementioned state of the art, proposing an MPC methodology for wind turbines that, using a single internal linear model, allows making use of the undeniable potentials of said methodology to improve an important aspect of the operation of wind turbines in great size and flexibility, such as the reduction of the structural load they support in zone III.

Specifically, the main novelty of this method consists in proposing a MPC with a single linear internal model. Of course, the model can be helped, if necessary, by exogenous blocks—not included in the optimization problem—that can contain auxiliary non-linear models. By leaving the non-linear functions out of said internal linear model, the convergence and computational load of the optimization algorithm are not compromised.

Such a linear internal model will describe, with a certain degree of accuracy, the dynamic behavior of at least the rotor, drive train and generator of the wind turbine. Likewise, the model will have as inputs, at least, the aerodynamic torque generated by the wind on the rotor and the "set-point" for the generator torque, the first being considered as disturbance and the second as manipulated variable.

However, although the fact of using a single linear internal model avoids the problems of the state of the art described above by leaving out of the linear internal model the description of the non-linear aerodynamics of the turbine, this obviously obliges to obtain by other ways the mentioned aerodynamic torque. Said means will be described later in the preferred embodiment section as implementation alternatives.

Even more specifically, the phases of the method of the invention would be the following:

1. Approach to the internal model of the MPC, using a single linear model.

The quality of the prediction to be made by the MPC controller about the future evolution of the system to be controlled depends on the accuracy of the internal model that describes the dynamics of interest. In this case, in order to predict the torsional vibrations of the shaft and/or those of the blades in the plane of rotation, the elements of interest are the drive train and the turbine rotor, since they are the symmetrical vibrations of the flexible part of the blades that appear in the plane of the rotor which normally excites the torsional vibration of the shaft.

On the other hand, the inputs to the internal model are the aerodynamic torque (generated by the wind on the rotor) applied at one end and the generator torque set-point, applied by the other. The outputs of the internal model are the torsion torque on the low speed shaft—before the gearbox-, the speed of the generator, the mechanical power generated, the torque experienced by the blades and the generator torque.

The dynamic relationship between inputs and outputs can be represented in different ways by mathematical models arising from experimental input-output data. Said models can start from the physical description of the mechanical system or they can have a purely numerical nature. Once its structure is proposed, the parameters of the model are calculated from experimental data, measured under the functional conditions contemplated.

The choice of this linear internal model is the main differentiating factor over other MPC approaches to control wind turbines that use internal models that include rotor aerodynamic dynamics. As has already been said, said highly non-linear dynamics is the main responsible for the applicability problems of said MPCs. Of course, these approaches make it possible to use the angle of attack (pitch) of the blades as manipulated variable and propose the integral control of the turbine (pitch and torque of the generator).

However, in the present invention, pitch control is given up by the MPC, leaving it in the hands of standard control, as this entails an important advantage for practical implementation, since it is a control loop subjected to very high safety certification requirements and therefore many turbine manufacturers are reluctant to make major changes to it.

2. Obtaining the parameters of the internal linear model from experimental data measured at the turbine itself.

The identification of the model parameters is carried out from experimental data measured at the turbine itself. This is performed from, above all, main frequencies detected at the speed of the generator, when the turbine is under conditions of high structural load. On some occasions it is also possible to count with load measurements on the blades, since some modern turbines incorporate load sensors at the root of the blades.

MPC controllers are characterized in that they are very robust faced to changes in the parameters of the internal model, so that an approximate parameter estimation may be sufficient.

3. Choice of control and prediction horizon.

In this phase, appropriate values are chosen for both parameters, that is, the control and prediction horizon, so as to balance the feedback control action (feedback) and the open-loop control action (feedforward), maintaining the necessary computational load as low as possible. The feedback control is based on the measurements made directly from the turbine during the operation of the controller and the open loop one is based on the prediction of the future behavior of the system obtained by the internal linear model.

Depending on the quality of the model and the measurements taken in the turbine in the previous step, as well as the duration of transients and system delays, the prediction and control horizons are chosen so that, always maintaining the computational load—higher the greater the horizons—as low as possible, it is possible to impose a good dynamic behavior on the turbine.

4. Adjusting the MPC controller.

Once the internal linear model has been proposed as explained in the previous steps, the inputs are, on the one hand, the "set-point" of the generator torque, which will be used as a control variable (also called the manipulated variable) and, on the other hand, the aerodynamic torque applied to the blades by the wind, which is defined as disturbance. Said disturbance must be estimated using the variables measured in the wind turbine obtained in the second step. The estimation can be done externally, or it can be done internally, taking advantage of the state observer with which the MPC of the invention is equipped.

Likewise, the control objective can be chosen, for example, to minimize the torsion that appears in the drive train shaft, to reduce the torsional vibrations that may appear as much as possible. Or, it is also possible to choose the minimization of the torsion of the blades, of the fluctuation of the mechanical power generated, of the changes in the nominal speed of the rotor or a partial or total combination of all the above. Said flexibility in the approach to the control objectives is one of the advantages that appear when defining, in a general way, the invention.

At this point, it is also necessary to adjust the weights of the MPC controller, especially in relation, on the one hand, to the aggressiveness of the control law (how strong is the action of the manipulated variable) and, on the other, to the speed of the state observer (how fast the estimation of the internal states of the model adapts, as a function of the evolution of the generator speed measurement). Said adjustment must be carried out trying to make the observers action as fast as possible, maintaining a sufficient margin of robustness in the face of noise from the generator speed measurement and, on the other hand, that the control is sufficiently aggressive, without disturbing too much the power generated by the turbine. It must be remembered that the generator torque is used for the control action, but that this in turn has a direct impact on the generated power. This dilemma appears in a general way when applying the methodology proposed in the definition of this invention.

5. Implementation test: A study is carried out on the computational load associated with the resulting algorithm, considering the possible limitation in the number of iterations that the MPC optimization algorithm needs to obtain the value of the manipulated variable at each sampling time. The need to impose restrictions on the system parameters, at least on the value that the generator torque can reach, and the impact that this may have on practical implementation is also analyzed.

BRIEF DESCRIPTION OF THE DRAWINGS

In order to help a better understanding of the features of the invention, according to a preferred example of a practical embodiment thereof, a series of drawings is provided as an integral part of said description wherein, with an illustrative and non-limiting nature, the following has been represented.

DETAILED DESCRIPTION OF A PREFERRED EMBODIMENT OF THE INVENTION

Next, and together with the figures, a possible embodiment of the invention is described, that is, the MPC method applied to a wind turbine, specifically to the reference turbine for developments, proposed by the national laboratory for renewable energies in the US NREL (National Renewable Energy Laboratory). This turbine has a power of 5 MW and has become a well-known and widely used case study, both in academia and in industry.

Following the steps previously described in a general way, they are:

1. Approach to the internal model, using a single linear internal model.

As already mentioned in the previous section, the quality of the prediction to be made by the MPC controller on the future evolution of the system to be controlled depends on the accuracy of the internal linear model that describes the dynamics of interest. The use of a single linear model is the main differentiating factor with respect to other MPC approaches for wind turbine control, which use either internal models that include highly non-linear dynamics, or different linear models for each operating point (for different wind speeds).

As it was initially said in the Object of the Invention section, setting the control objective, in order to predict the torsional vibrations of the shaft and/or those of the blades in the plane of rotation, the elements of interest chosen are the drive train and the turbine rotor, since they are the symmetrical vibrations of the flexible part of the blades that appear on the rotor plane that normally excite the torsional vibration of the shaft.

In this example of embodiment of the invention and therefore of application, the structure of the dynamic model is based on the physical description of the mechanical elements of interest mentioned above. Specifically, a physical model of 3 masses joined by flexible elements is used. The masses represent the equivalent moment of inertia of the dynamic elements of the turbine whose behavior we want to improve. Flexible elements introduce stiffness and damping that can be deduced from the dynamic study of the system.

The inputs to the 3-mass model are the aerodynamic torque (the one generated by the wind on the rotor at each instant) applied at one end and the generator torque, applied by the other. In addition to the 3-mass model, the dynamic response of the generator is incorporated into the internal linear model, which relates the torque set-point (manipulated variable of our controller) with the torque that is effectively applied at any time to the generator mass.

Figure 1:
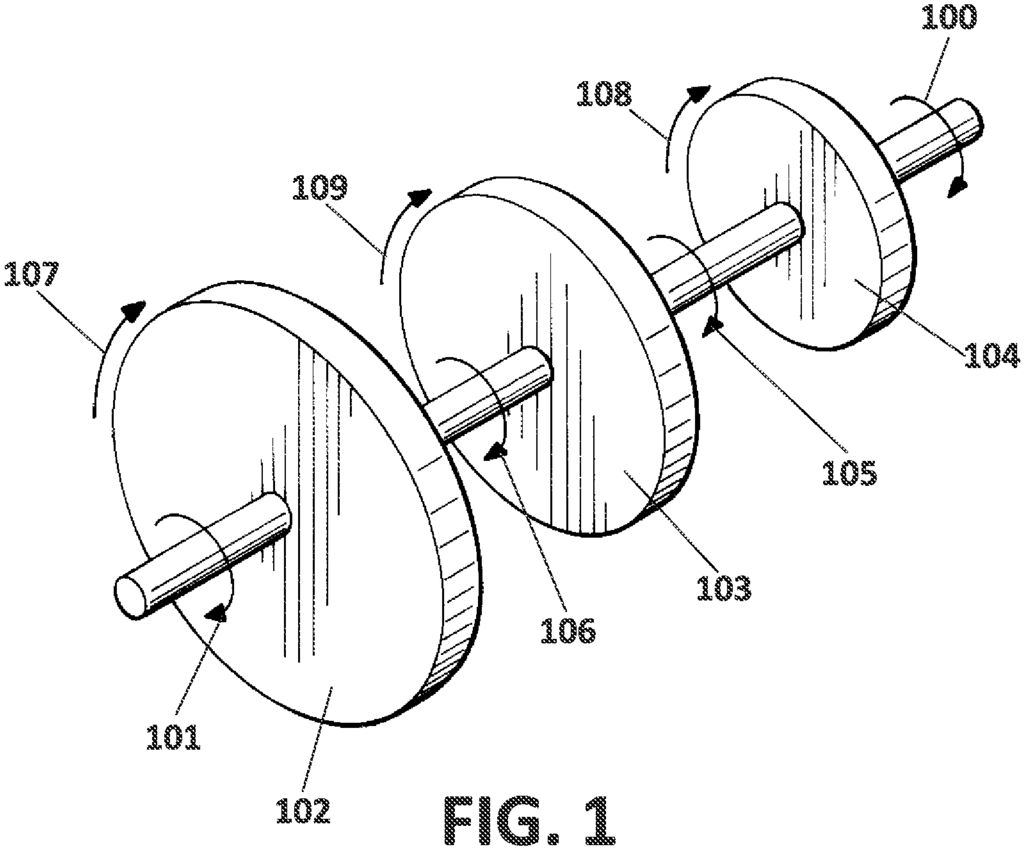
FIG. 1.—Shows a schematic and simplified view of the internal 3-mass model.

Specifically, as can be seen in FIG. 1, for a preferred embodiment of the invention we will use a classic model of 3 masses that represent: the moment of inertia of the flexible part of the blades, Jblades (102), the moment of inertia of the rigid part thereof plus the hub, Jhub (103) and, finally, the moment of inertia of the generator, Jgen (104).

A simple first order dynamics is added in cascade to this mechanical model to describe the response of the generator torque (100) to its set-point, which is declared as input to the internal linear model and the only manipulated variable of the controller. Said model is not explicitly represented in FIGS. 1 and 2, but it is in FIG. 3.

Said FIG. 1 also shows the other input to the internal linear model, which is the aerodynamic torque (101) generated by the wind and applied by the rotor on the shaft. On the other hand, the outputs that can be used, alone or in combination with each other, are: the torque applied to the drive shaft (105), referred to the low speed zone (LSS), before the gearbox; the torque appeared in the blades (106), the angular speed of the rotor (107), the angular speed of the generator (108), the angular speed of the hub (109), the generator torque (100) and the mechanical power, obtained by multiplying the generator torque (100) by the angular speed of the generator (108).

Figure 2:
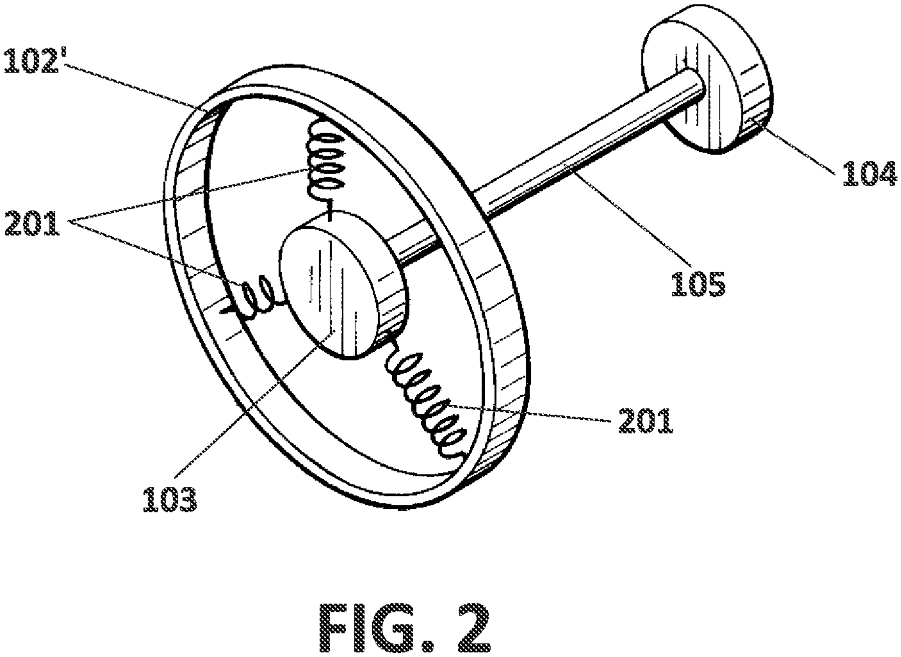
FIG. 2.—Shows a schematic and simplified view of the wind turbine rotor as a torsional system.

The physical representation that this model makes of the structural loads that take place on the rotor (blades and hub) of a wind turbine is explained considering that the torsional dynamics in the plane of rotation of the blades is a complex phenomenon, due to the not uniform distribution of mass, stiffness and angle of attack along them, but which can be simplified as a torsional system like the one shown in FIG. 2. As the aforementioned torsion in the plane occurs far enough from the hub, the blades can be divided into two parts, a rigid and a flexible one. The rigid part of the blades is included, together with the inertia of the hub, in the moment of inertia Jhub (103), which is elastically connected by three springs (201), representing the rigidity of the blades, to the flexible part thereof, whose mass is supposed to be uniformly distributed in the plane of rotation, forming the moment of inertia of the flexible part of the blades Jblades (102). Likewise, the moment of inertia of the rigid part of the blades plus the hub Jhub (103) is connected through the drive shaft to the moment of inertia of the generator Jgen (104), where said drive shaft has certain stiffness Kgen and damping Dgen.

Finally, it is possible to linearly accumulate the three elastic connections or springs (201) in a single one-shaft (106) between Jblades (102) and Jhub (103)—that linearly collects the accumulated stiffness of the blades Kblades and the damping—considered negligible—Dblades of the three blades, in order to obtain the torsional model in FIG. 1. In this way, we can consider, separately, the two most important degrees of freedom that appear in the turbine rotor. For its part, in FIG. 2, the moment of inertia of the flexible part of the blades Jblades in the plane of rotation (102) is represented in FIG. 1 as the disc (102).

We must bear in mind that, in this model, the Kblades and Dblades parameters will be considered as constructive characteristics of the shaft (106) that joins the moment of inertia of the flexible part of the blades Jblades (102) and the moment of inertia of the rigid part of the blades plus the hub Jhub (103) and that the stiffness Kgen and damping Dgen are of the drive shaft that joins, in turn, said moment of inertia of the rigid part of the blades plus the hub Jhub (103) and the moment of inertia of the generator Jgen (104)

Finally, given that the electrical dynamics of the generator is several orders of magnitude faster than the mechanical one, it is considered a dynamic response of first order with a time constant that depends on the specific characteristics of the generator and the adjustment of its internal control loops. Once this model has been added to the previous one, we have defined the internal linear model of the MPC to calculate the prediction during the chosen time horizon that is used in this application example.

2. Obtaining the model parameters from experimental data measured in the turbine itself.

According to a preferred embodiment, the identification of the model parameters: equivalent moments of inertia, stiffness and damping of the shafts, is carried out from experimental data measured in the turbine itself, starting, above all, from the main frequencies detected in the measurement of the speed of the generator when the turbine is under conditions of high structural load. On some occasions, it is also possible to have load measurements on the blades, since some modern turbines incorporate sensors at the junction of the blades with the hub. As already indicated, since the MPC controllers are characterized by being very robust faced to changes in the parameters of the linear internal model, an approximate parameter estimation is sufficient.

Thus, for the specific application example defined in the first phase of the method described above, a reference turbine in the academic and industrial field NREL™ 5 MW is used, whose dynamic behavior can be studied in detail using, for example, the well-known package of FAST® software simulation, also developed by the NREL™ laboratory, it is freely distributed and constitutes a well-known tool in the field of application.

Thus, with the help of said software, the frequency content of the torsion of the low-speed shaft of the turbine is analyzed and two main frequencies are observed, at 1.7 and 4 Hz. The extraction of said frequency components could be done in the same way in any real wind turbine during its operation with high structural load, through the angular speed measurements of the generator. Once these main frequencies are known, the value of the model parameters defined in step 1 is obtained, using the physical description of the mechanical system. In this case they would be:

Moment of inertia of the flexible part of the blades Jblades (102)=3.1263e07 Kg*m2;

Moment of inertia of the rigid part of the blades and the hub Jhub (103)=4.1812e06 Kg*m2;

Moment of inertia of the generator Jgen (104) =5.0255e06 Kg*m2;

Cumulative stiffness of the blades, Kblades=1.3483e09 Nm/rad;

Stiffness of the drive shaft that joins rotor and generator, Kgen=8.67637e08 Nm/rad;

Cumulative damping of the three blades, Dblades=0 Nms/rad;

Damping of the drive shaft that joins rotor and generator, Dgen=6.2515e6 Nms/rad.

3. Choice of control and prediction horizon.

According to step 3 of the general embodiment previously described, in order to choose the discrete value of said horizons, on the one hand, the dynamics to be controlled, observed in the turbine in the previous step 2, are taken into account and, on the other hand, the degree of accuracy to be expected from our model.

Thus, a prediction time of 1 second is chosen, which is sufficient, on the one hand, to sufficiently describe the oscillatory behavior to be compensated. On the other hand, the internal model is linear and asymptotically stable, which makes it possible to use a terminal weight—at the end of the prediction horizon-constituted as a Lyapunov function based on an infinite horizon, which is convergent when the system is stable and autonomous with input null as of the end of the prediction time. This terminal weight guarantees (sufficient condition, not necessary) the stability of the controller and, although this test is not considered essential in many industrial implementations of current MPC controls, since the controlled system appears stable under nominal conditions when the horizon is long enough, is very appreciated in mechanical systems such as large wind turbines.

On the other hand, in order to reduce the computational load and increase the robustness when faced to model errors—especially at the moment of inertia of the flexible part of the blades Jblades, due to the possible accumulation of ice and/or dirt-, a control horizon of just 0.25 seconds is chosen. Taking into account that the chosen sampling frequency is 80 Hz, this provides prediction and control horizons of 80 and 20 samples, respectively.

4. Adjusting the MPC controller.

As explained in the general method, the aerodynamic torque (101) generated by the incidence of the wind on the rotor is considered an input disturbance. Specifically, for this preferred embodiment, we are going to consider said aerodynamic torque (101) as measured disturbance (MD) and we are going to obtain it separately, outside the MPC, from the physical model.

To estimate said aerodynamic torque (101) we will use a method that involves obtaining the derivative of the generator speed. This method gives good results, although it makes it necessary to face filtering and its drawbacks, especially those caused by delay.

Electromagnetic noise should be reduced as much as possible before deriving a signal, since this process amplifies the effect of such noise. Therefore, filters are often used which, on the other hand, inevitably have a certain delay associated with them—phase shift. This makes it convenient to carefully design the aforementioned filters to achieve a certain dilemma between eliminating unwanted frequencies and not introducing excessive delay in the derived signal that, logically, also appears in the estimated aerodynamic torque. This delay is the main cause of loss of control performance and, therefore, should be kept as low as possible. For this, we use, prior to the derivative, specific filters to eliminate the predominant frequencies in the signal for this case and, later, low-order low-pass filters that do not introduce excessive phase shift in the derived signal.

By deriving the instantaneous angular speed of the generator, we obtain the acceleration caused at each moment by the force of the wind on the rotor. Considering said angular acceleration, the torque applied by the generator and the total moment of inertia, using in this case a simplified model of a mass, it is possible to calculate the aerodynamic torque, as shown in the lower part of FIG. 3, dedicated to the internal description of the block (317), which represents the estimator, external to the MPC control, of the aerodynamic torque that means the disturbance of the system.

Figure 3:
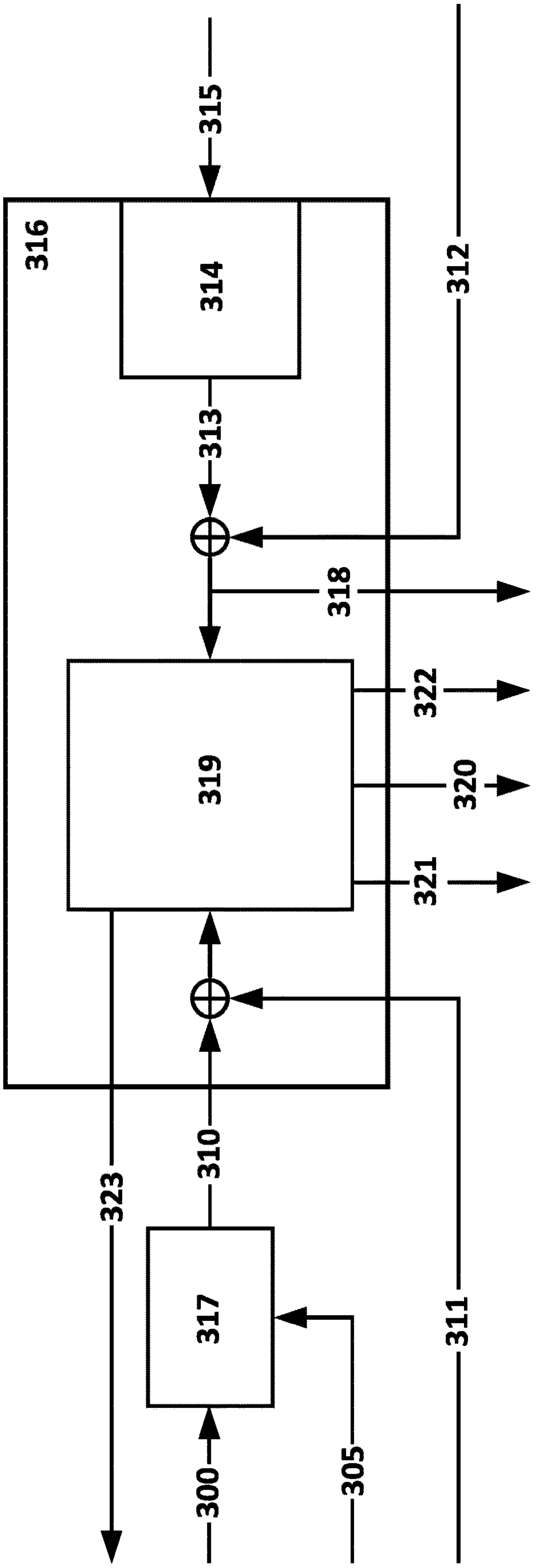
FIG. 3.—Shows a schematic view of the linear internal model of the invention.

Said FIG. 3 presents a block diagram that describes the general structure of the approach used for the anti-vibration control which is the object of the invention, representing the internal linear model (316) as the set used by the MPC controller, the three-mass model (319) described above and represented in FIG. 1 and the first order dynamic model (314) that represents the dynamics of the wind generator between the "set-point" of the generator torque (315) and the torque of said generator (313).

Figure 4:
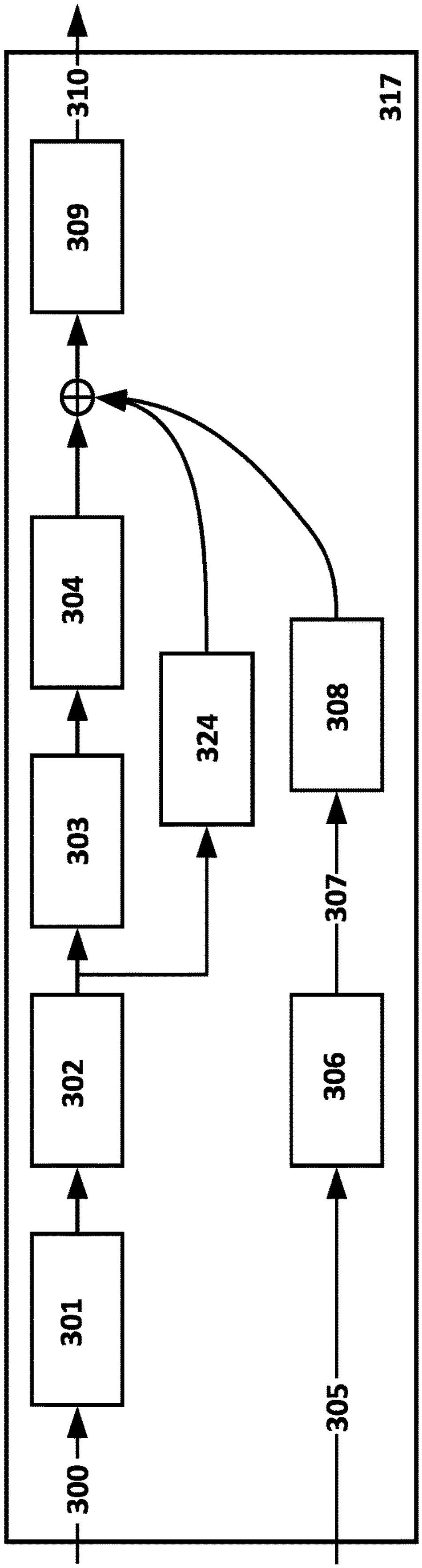
FIG. 4.—Shows a schematic view of the external disturbance estimator.

In FIG. 4, dedicated to the external estimator of aerodynamic torque (317), it can be seen that the measured angular speed of the generator (300) successively passes through band-stop filters (Notch) of 1.7 Hz. (301) and 4 Hz. (302) to reduce the effect of the natural modes of vibration of the rotor-drive train assembly. The filtered angular speed is then multiplied by the total damping divided by the ratio of the gearbox N ((Dblades+Dgen)/N) (324). On the other hand, the filtered angular speed is derived (303) to obtain the angular acceleration, which is multiplied by the total moment of inertia of the system, also divided by the ratio of the gearbox N ((Jblades+Jhub+Jgen)/N) (304). In parallel, we obtain the torque that the generator is applying at this instant (307), from the current measurements of the stator (305) in the block (306), from the constructive description of the generator. Such torque is multiplied by the ratio of the gearbox N in (308). Thus, we already have the three aerodynamic torque components (310) which, once added up, are filtered by a $2^{nd}$ order low-pass filter (309) with a cut-off frequency of 4 Hz.

Likewise, as can be seen in FIG. 3, dedicated to the general structure of the MPC approach, two additional inputs are added to the internal linear model (316), defined as unmeasured disturbances (311) and (312) that represent, respectively, the errors in the estimation of the aerodynamic torque (310) and in the generator torque (313), the latter calculated from its first order dynamic model (314) and the "set-point" of said generator torque (315), which constitutes the control variable. The inputs (311) and (312) will be estimated by the state observer of the MPC and give robustness to the system faced to modeling errors and temporal variation of parameters. It is observed that the generator torque (318) that enters the three-mass model (319) is not calculated from the stator current measurements (305), as when we estimated the aerodynamic torque (310), since they are inherently noisy measurements that could impair the stability of the Kalman filter that we use as a state observer.

Finally, the following are described as outputs of the internal linear model (316): the torsional torque that appears in the low-speed shaft—before the mechanical gearbox—of the drive train (320), the mechanical power generated at each instant (321), the torque suffered by the flexible part of the blades (322), the corrected generator torque (318) and the angular speed calculated from the generator (323) by the internal linear model (316). Of all of them, the only one that is measured is the measured angular speed of the generator (300). In fact, the internal state observer (Kalman) of the MPC works exclusively from the difference between the measured angular velocity of the generator (300) and the angular speed of the generator (323) calculated by the linear internal model (316). The rest of the outputs can be used to control and/or limit important aspects of the dynamic operation of the turbine.

For this application example, the cost function, the minimization of which will define the control path, includes non-zero weights in the outputs referred to the torsional torque that appears in the low-speed shaft—before the mechanical gearbox—of the transmission train (320), the mechanical power generated at each instant (321), in the ratio of change (rate) and the absolute value of the control variable (315) which, in this case, is the torque "set-point" of the generator. Said weights proportionally penalize the deviations that occur in the aforementioned signals with respect to their "set-point" (in the case of outputs), null value (change ratio) and nominal value (control variable (315)). The choice of the relative value of all the mentioned weights shows the aggressiveness/robustness of the control law. In this case, therefore, the control objective is focused on optimally eliminating torsional vibrations from the drive train shaft before the gearbox, without unduly altering the generated power.

Likewise, it is necessary to adjust the state observer (Kalman filter) that allows estimating the unmeasured states of the linear internal model (316). Said adjustment decides the balance between the speed in the estimation and its sensitivity to noise of measurement of the measured angular speed of the generator (300).

Alternative Practical Embodiment 1

On the other hand, apart from the preferred embodiment described above related to how to manage the main disturbance, it is also possible to define the aerodynamic torque (310) that appears as input to the internal linear model (316) as unmeasured disturbance (UD) when defining the controller and estimate it internally through the aforementioned state observer (Kalman) included therein. In that case, we would eliminate block (317) from FIG. 3 and add an unmeasured persistent disturbance model to the linear internal model (316). The linear internal model (316) then creates an additional state associated with the aerodynamic torque (310), which can be estimated by the Kalman filter. Entry (311) is no longer required. In this case, again a certain delay in the estimation is unavoidable and again we are faced to the dilemma between the speed of estimation and the sensitivity to noise of the generator speed measurement.

Alternative Practical Embodiment 2

Finally, another possible way to manage the main disturbance due to aerodynamic torque (310) is based on the use of a sensor that provides a measure of the incident wind with some anticipation. These sensors use sweeps of one or more laser beams to estimate the wind speed at a certain distance from the turbine rotor. They are increasingly accurate, fast and inexpensive; they are known by their acronym LIDAR (Laser Imaging Detection and Ranging). In our case, they allow us to take advantage of the signal previsualization incorporated by the MPC and, in this way, eliminate the delay that appears in the control action due to the delay in the estimation of the aforementioned disturbance, as well as the generator delay. These delays are mainly responsible for the performance losses in the controlled system, since they cause unwanted transients.

In this case, when designing the MPC, the aerodynamic torque (310) is again considered as measured disturbance (MD), but now the disturbance can also be incorporated with a certain temporal preview that allows the MPC to take into account the future disturbance during the internal calculation of the prediction horizon and, thus, to be able to anticipate the control action, compensating for the generator delay and largely avoiding transients.

It is undoubtedly the option that best uses the full potential of the MPC, but it requires the turbine to have a LIDAR sensor installed. To calculate, externally to the MPC, the aerodynamic torque (310) based on the forward measurement of effective wind provided by the LIDAR, at each sampling instant, we use the non-linear aerodynamic model of the turbine rotor. Since this model requires the value of the angle of attack of the blades (pitch) and rotor speed, it is considered that these dynamics are much slower than the electrical dynamics that governs the generator torque (318) and we update these values only at each sampling instant of the MPC with its current measured value. In this case, a longer control horizon will be used than in previous versions, since now it is important to act well in advance (feedforward). We can expect very good performance, if the preview is also good. Of course, it will be necessary to limit the manipulation of the generator torque set-point (315) and/or carefully restrict the variation of the mechanical power generated at each instant (321) to reach a certain dilemma between eliminating mechanical and electrical vibrations, depending on the priorities of each wind farm and each moment.

5. Implementation test.

Finally, as already mentioned, in the final phase of the method of the invention, a study is carried out on the computational load associated with the resulting algorithm, considering the possible limitation in the number of iterations allowed for optimization. The need to impose restrictions on system parameters and the impact this may have on practical implementation is also discussed.

Obviously, the implementation platform shall be able to widely bear the calculated load and, at that moment, the implementation of the anti-vibration system can be considered an update of the software related to the generator control, since it does not require any change in the turbine hardware. The latter is considered important in order to favor the applicability of the proposed method.

More specifically, according to a preferred embodiment, once the controller has been planned and adjusted, it must be verified that the available control platform meets the necessary execution requirements. For this, two things are fundamentally taken into account: the computational load that said platform shall face and the application restrictions that shall be imposed in the execution of the algorithm. Actually, restrictions shall be taken into account to calculate the computational load, because it is known that the activation of restrictions significantly influences the number of iterations necessary for the convergence of the optimization algorithm. As a security measure, the maximum number of iterations should be limited so that, under no circumstances, overload problems may appear in the control processing.

To test the system of the invention, a turbulent wind field incident on the rotor, with an average speed of 20 m/s and 17% turbulence, generated with the "Turbsim™" software package is applied to the turbine model. This software has also been implemented by NREL™, it is freely distributed and is a standard in the academic and industrial field for the generation of stochastic wind fields of a turbulent nature. The comparative performance of the system, during 50 seconds of zone III turbulent wind (above the nominal wind value), is presented in FIGS. 5, 6 and 7.

Figure 5:
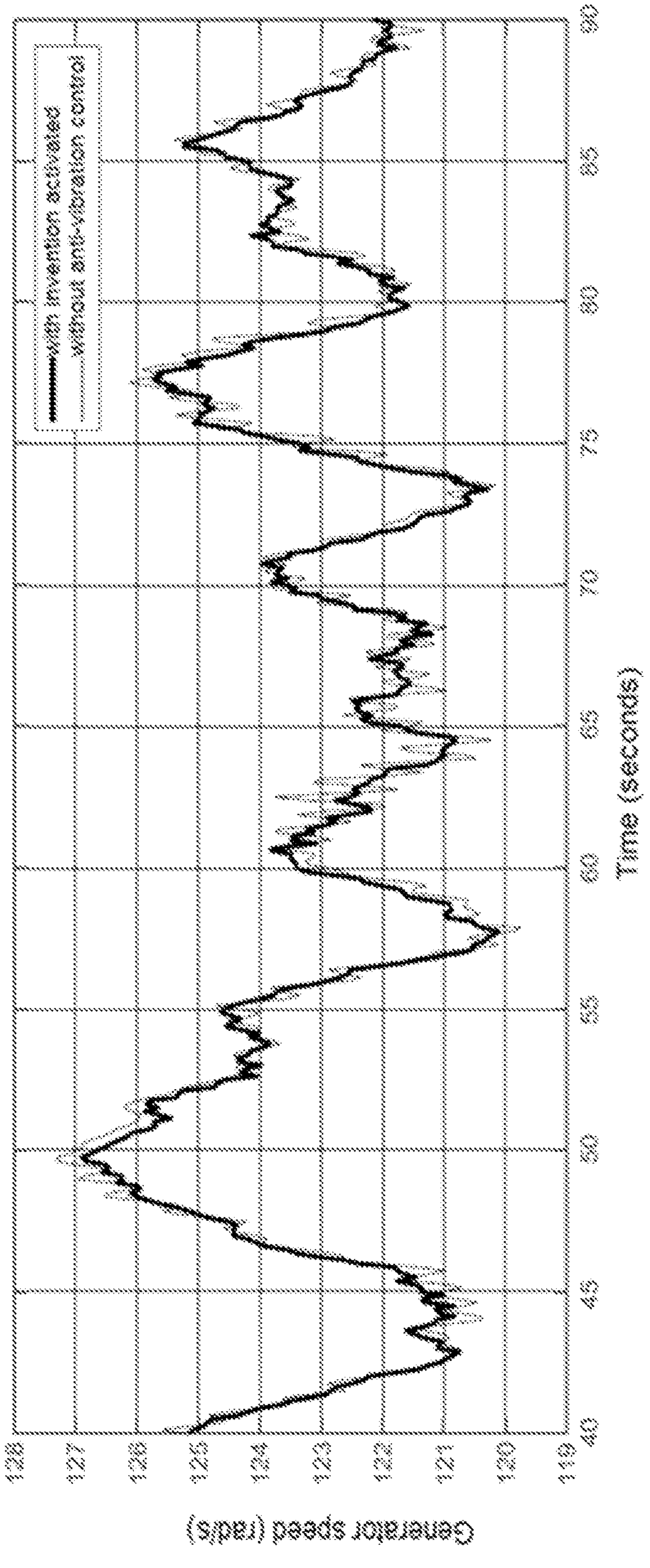
FIG. 5. Shows a comparative graph between the speed of the generator without control and with control.

In FIG. 5 you can see the generator speed in rad/s, without the use of the invention (thin line) and with the anti-vibration control which is the subject matter of this invention (thick line). We observe that the generators low-frequency behavior hardly changes, since control of the angle of attack (pitch) continues to rely on the standard controller. However, it is observed how the control of the present invention eliminates the superimposed vibrations coming from the shaft torsion and the symmetrical oscillations of the rotor blades, when it is found that oscillations between 1.7 Hz. and 4 Hz, typical of this mechanical system—see point 2-, do not appear in the generator speed when the proposed control is active.

Figure 6:
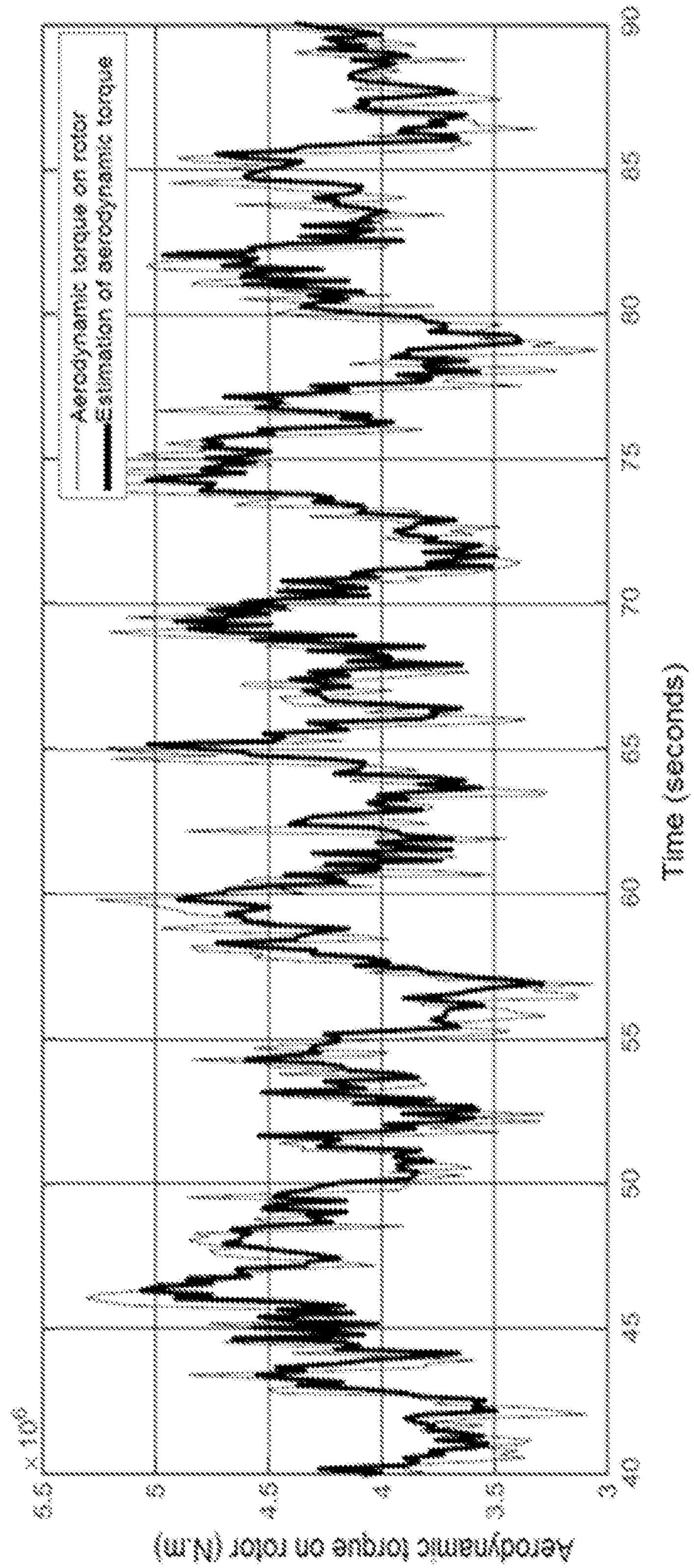
FIG. 6. Shows a comparative graph between the aerodynamic torque on the rotor and its estimation.
Figure 7:
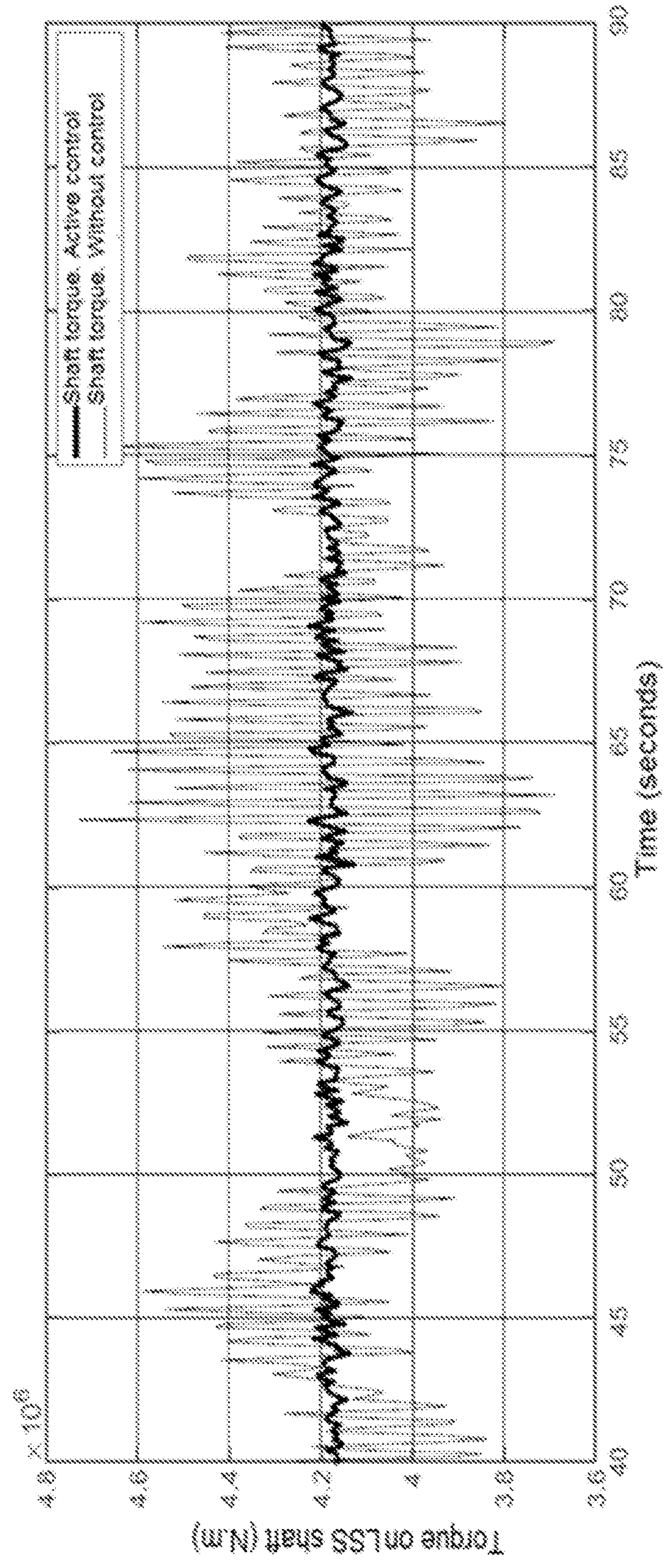
FIG. 7. Shows a comparative graph between the torque on the low speed shaft (LSS) without control and with control.

On the other hand, FIG. 6 shows the aerodynamic torque applied by the rotor (thin line) and the estimate we make of said torque based on the physical description that we have described in step 4 (thick line). We found that the estimation of the aerodynamic torque is carried out with a certain delay, which does not prevent a very good performance in the elimination of the torsion of the low speed shaft (LSS), as seen in FIG. 7, where the torque without control is presented in a thin line and with the invention activated in a thick line. In this way, fatigue in various mechanical elements is avoided, mainly in the mechanical gearbox, as this element is one of those more susceptible to fatigue failure in modern turbines.

Finally, it should be indicated that for this embodiment the controller has been implemented in C code and executed in real time on a computer with an Intel™ Core 2 Duo E6750 microprocessor (2.66 GHz, 1333 MHz FSB), with characteristics very similar to the devices found on mid-range control platforms today.

In no case have more than 6 iterations been necessary to solve the quadratic optimization problem (as a safety measure, the iterations had been limited to a maximum of 20). In the worst case, for 6 iterations, the total execution time, including the external estimate of the aerodynamic torque, has been 4.5e-5 s., which is very far from the sampling period used (0.0125 s.). In this way, it is not even necessary to include the computational delay in the model and the applicability of the proposed method on any current control platform is guaranteed in the intended format, namely, as an update of the wind generator control software.

The invention claimed is:

1. A model-based predictive control method (MPC) for the reduction of structural load in wind turbines, comprising the steps of:

i.—exclusively proposing a single linear internal model for the MPC, leaving aerodynamic behavior of a rotor out of such internal model throughout an operating range of a wind turbine and defining, at least:

two inputs, a first input being aerodynamic torque that affects a rotor of the wind turbine, defined as a disturbance and, a second input being a "set-point" for generator torque, defined as a manipulated variable; and an output that allows monitoring a structural load to be reduced, defined as a control objective;

ii.—obtaining parameters of the linear internal model from experimental data, previously measured in the turbine;

iii.—choosing time values for control and prediction horizons, so as to balance a feedback control action and an open-loop action and to keep computational load as low as possible, wherein:

the feedback control action is based on measurements obtained directly from the turbine during operation of an MPC controller; and the open loop action is based on a prediction of the future behavior of the system provided by the linear internal model;

iv.—adjusting the MPC controller by:

adjusting weights of a cost function of the MPC controller to set a degree of aggressiveness of a control action by the manipulated variable, as well as expected performance in achieving the control objective; and adjusting a state observer used by the MPC controller to set a speed of estimation of unmeasured internal states of the system, as well as a sensitivity of the observer to measurement noise of a measured angular speed of a generator and v. carrying out an implementation test to verify feasibility of executing a designed MPC controller on a control platform.

2. The model-based predictive control method (MPC) for the reduction of structural load in wind turbines of claim 1, wherein the dynamic relationship between the inputs and outputs is represented by a mathematical model extracted from the experimental data on said inputs and outputs.

3. The model-based predictive control method (MPC) for the reduction of structural load in wind turbines of claim 1, wherein the dynamic relationship between inputs and outputs is represented by a mathematical model of the physical description of the mechanical system.

4. The model-based predictive control method (MPC) for the reduction of structural load in wind turbines of claim 1, wherein the adjustable parameters of the linear internal model are obtained from main frequencies measured at the turbine when it is under conditions of high structural load.

5. The model-based predictive control method (MPC) for the reduction of structural load in wind turbines of claim 1, wherein the input considered as a disturbance, that is the aerodynamic torque, is externally estimated using variables measured in the turbine during the execution of the control.

6. The model-based predictive control method (MPC) for the reduction of structural load in wind turbines of claim 5, wherein the input considered as a disturbance, that is, the aerodynamic torque, is externally estimated using the anticipated measurement of effective wind that will affect the rotor, obtained by means of a LiDAR type sensor.

7. The model-based predictive control method (MPC) for the reduction of structural load in wind turbines of claim 1, wherein the input considered as a disturbance that is, the aerodynamic torque, is internally estimated using the state observer included in the MPC.

8. The model-based predictive control method (MPC) for the reduction of structural load in wind turbines of claim 1, wherein the implementation test is carried out on:

the computational load, considering a number of iterations that an MPC optimization algorithm uses to obtain the value of the manipulated variable at each sampling time; and determining whether to impose restrictions, at least, on the value that the generator torque can reach and on its effect on a practical implementation of the MPC controller.

9. The model-based control method (MPC) for the reduction of structural load in wind turbines of claim 1, wherein the torque applied on a drive shaft referred to a low speed zone (LSS) is used as the output that allows monitoring the structural load to be reduced.

10. The model-based predictive control method (MPC) for the reduction of structural load in wind turbines of claim 1, wherein the torque that appears in blades is used as the output that allows monitoring the structural load to be reduced.

11. The model-based predictive control method (MPC) for the reduction of structural load in wind turbines of claim 1, wherein the angular speed of the rotor is used as the output that allows monitoring the structural load to be reduced.

12. A wind turbine configured for application of the control method of claim 1.

* * * * *